(12) United States Patent
Hao et al.

(10) Patent No.: US 11,242,071 B2
(45) Date of Patent: Feb. 8, 2022

(54) METHOD, DEVICE AND APPARATUS FOR GENERATING A DEFENSIVE DRIVING STRATEGY, AND STORAGE MEDIUM

(71) Applicant: Baidu Online Network Technology (Beijing) Co., Ltd., Beijing (CN)

(72) Inventors: Dayang Hao, Beijing (CN); Changchun Liu, Beijing (CN); Yaqin Chen, Beijing (CN); Peng Geng, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 102 days.

(21) Appl. No.: 16/721,010

(22) Filed: Dec. 19, 2019

(65) Prior Publication Data
US 2020/0290642 A1    Sep. 17, 2020

(30) Foreign Application Priority Data

Mar. 13, 2019    (CN) .......................... 201910189121.8

(51) Int. Cl.
*B60W 60/00* (2020.01)
*B60W 30/09* (2012.01)
(Continued)

(52) U.S. Cl.
CPC ........ *B60W 60/0016* (2020.02); *B60W 30/09* (2013.01); *B60W 30/0956* (2013.01);
(Continued)

(58) Field of Classification Search
None
See application file for complete search history.

(56) References Cited

U.S. PATENT DOCUMENTS

| 6,035,053 A * | 3/2000 | Yoshioka ............... G01S 13/42 |
| | | 382/104 |
| 8,874,372 B1 * | 10/2014 | Zhu ................... G08G 1/096775 |
| | | 701/514 |

(Continued)

FOREIGN PATENT DOCUMENTS

| CN | 102887147 A | 1/2013 |
| CN | 105083281 A | 11/2015 |

(Continued)

OTHER PUBLICATIONS

First Office Action, The State Intellectual Property Office of People's Republic of China, Application No. 201910189121.8, dated Mar. 10, 2020, 14 pages.

(Continued)

*Primary Examiner* — James J Lee
*Assistant Examiner* — Tawri M Matsushige
(74) *Attorney, Agent, or Firm* — Faegre Drinker Biddle & Reath LLP (57) ABSTRACT

A method, a device and an apparatus for generating a defensive driving strategy and a storage medium are provided. The method includes: detecting a type of each obstacle of a plurality of obstacles in a sensible range of an autonomous vehicle; determining whether there is a collision risk of the autonomous vehicle with the obstacle by using a collision risk detection method corresponding to the type; and determining the defensive driving strategy for the autonomous vehicle when the obstacle has a collision risk with the autonomous vehicle in the sensible range. According to the embodiments, an occurrence probability of a dangerous condition on a road may be reduced.

9 Claims, 5 Drawing Sheets

--- detecting a type of each obstacle of a plurality of obstacles in a sensible range of an autonomous vehicle — S11 determining whether there is a collision risk of the autonomous vehicle with the obstacle by using a collision risk detection method corresponding to the type — S12 determining the defensive driving strategy for the autonomous vehicle when the obstacle has a collision risk with the autonomous vehicle in the sensible range — S13

(51) Int. Cl.
*B60W 30/095* (2012.01)
*G08G 1/16* (2006.01)
(52) U.S. Cl.
CPC ........ *B60W 60/00274* (2020.02); *G08G 1/16* (2013.01); *B60W 2520/10* (2013.01); *B60W 2552/00* (2020.02)

(56) References Cited

U.S. PATENT DOCUMENTS

| | | | | |
|---|---|---|---|---|
| 9,925,979 | B2* | 3/2018 | Deshpande | B60W 10/20 |
| 2014/0324297 | A1 | 10/2014 | Kim | |
| 2015/0035685 | A1* | 2/2015 | Strickland | B60Q 1/525 340/901 |
| 2015/0329112 | A1 | 11/2015 | Jeon et al. | |
| 2016/0272172 | A1* | 9/2016 | Lee | B60T 8/171 |
| 2016/0335892 | A1* | 11/2016 | Okada | G08G 1/123 |
| 2017/0329332 | A1 | 11/2017 | Pilarski et al. | |
| 2018/0178789 | A1 | 6/2018 | Nishimura et al. | |
| 2019/0034742 | A1* | 1/2019 | Gokan | B60T 7/12 |
| 2020/0189573 | A1* | 6/2020 | King | B60W 60/0011 |
| 2020/0192365 | A1* | 6/2020 | Russell | G06K 9/00798 |

FOREIGN PATENT DOCUMENTS

| | | |
|---|---|---|
| CN | 105480226 A | 4/2016 |
| CN | 106627574 A | 5/2017 |
| CN | 107031619 A | 8/2017 |
| CN | 107145147 A | 9/2017 |
| CN | 108725454 A | 11/2018 |
| DE | 102017118651 A1 | 2/2019 |
| EP | 3192698 A1 | 7/2017 |
| JP | 3280033 B2 | 4/2002 |
| JP | 2007125981 A | 5/2007 |
| JP | 2016134033 A | 7/2016 |
| JP | 2018106233 A | 7/2018 |
| WO | 2016195566 A1 | 12/2016 |
| WO | 2018038211 A1 | 3/2018 |

OTHER PUBLICATIONS

Search Report, State Intellectual Property Office of People's Republic of China, Application No. 2019101891218, dated Mar. 2, 2020, 5 pages.
Notice of Reasons for Refusal, Japanese Patent Office, Japanese Patent Application No. 2020-002519, dated Mar. 8, 2021, 7 pages (w/English translation).
Notification of Reason for Refusal, Korean Patent Office, Korean Application No. 10-1029-0179713, dated Mar. 17, 2021, 12 pages (w/English translation), 10-2019-017913.
Extended European Search Report, European Patent Office, Application 19220247.1-1203 to Baidu Online Network Technology (Beijing) Co., Ltd., dated Jul. 27, 2020, 9 pages.

* cited by examiner

METHOD, DEVICE AND APPARATUS FOR GENERATING A DEFENSIVE DRIVING STRATEGY, AND STORAGE MEDIUM

CROSS-REFERENCE TO RELATED APPLICATION

This application claims priority to Chinese Patent Application No. 201910189121.8, entitled "Method, Device and Apparatus for Generating a Defensive Driving Strategy, and Storage Medium", and filed on Mar. 13, 2019, which is hereby incorporated by reference in its entirety.

TECHNICAL FIELD

The disclosure relates to the technical field of automatic driving, and more particularly to a method, device and apparatus for generating a defensive driving strategy and a storage medium.

BACKGROUND

Defensive driving refers to such a driving manner in which a driver may predict dangers caused by other drivers, pedestrians, bad weather, or road conditions and may also timely adopt measures to prevent an accident during driving. According to an existing automatic driving technology, a defensive driving strategy may be not effectively generated.

SUMMARY

A method and device for generating a defensive driving strategy are provided according to embodiments of the disclosure, to at least solve the above technical problems in the existing technology.

According to a first aspect, a method for generating a defensive driving strategy is provided according to an embodiment of the disclosure, the method including:

detecting a type of each obstacle of a plurality of obstacles in a sensible range of an autonomous vehicle;

determining whether there is a collision risk of the autonomous vehicle with the obstacle by using a collision risk detection method corresponding to the type; and determining the defensive driving strategy for the autonomous vehicle when the obstacle has a collision risk with the autonomous vehicle in the sensible range.

In an implementation, in response to the obstacle of a first type, determining whether there is the collision risk of the autonomous vehicle with the obstacle, by using a first collision risk detection method corresponding to the first type, including:

acquiring a planned track of the autonomous vehicle in a preset period;

determining a predicted track of the obstacle in the preset period; and determining whether there is an intersection of the planned track with the predicted track, and determining that there is the collision risk of the autonomous vehicle with the obstacle if there is the intersection.

In an implementation, the determining a predicted track of the obstacle in the preset period includes:

determining the predicted track of the obstacle in the preset period according to a current speed and a current travelling direction of the obstacle.

In an implementation, wherein in response to an obstacle of a second type, determining whether there is the collision risk of the autonomous vehicle with the obstacle, by using a second collision risk detection method corresponding to the second type, including:

determining a stopping distance of the autonomous vehicle; and determining whether the obstacle is located at a current lane of the autonomous vehicle or a lane adjacent to the current lane, and is located in front of the autonomous vehicle; if the obstacle is located at the current lane or the lane adjacent to the current lane and is located in front of the vehicle, determining whether a distance in a longitudinal direction between the obstacle and the autonomous vehicle is shorter than the stopping distance; and if the distance is shorter than the stopping distance, determining that there is the collision risk of the autonomous vehicle with the obstacle, wherein the longitudinal direction is a travelling direction of the autonomous vehicle.

In an implementation, the determining the stopping distance of the autonomous vehicle includes:

determining the stopping distance of the autonomous vehicle according to a current speed of the autonomous vehicle and a road condition.

In an implementation, the defensive driving strategy includes: reducing a travelling speed of the autonomous vehicle or changing a planned track of the autonomous vehicle.

According to a second aspect, a device for generating a defensive driving strategy is provided according to an embodiment of the disclosure, which may include:

a detecting module configured to detect a type of each obstacle of a plurality of obstacles in a sensible range of an autonomous vehicle;

a judging module configured to determine whether there is a collision risk of the autonomous vehicle with the obstacle by using a collision risk detection method corresponding to the type; and a determining module configured to determine the defensive driving strategy for the autonomous vehicle when the obstacle has a collision risk with the autonomous vehicle in the sensible range.

In an implementation, the judging module may include:

a planned track acquiring sub-module configured to acquire a planned track of the autonomous vehicle in a preset period when the obstacle is of a first type;

a predicted track determining sub-module configured to determine a predicted track of the obstacle in the preset period when the obstacle is of a first type; and a first judging sub-module configured to determine whether there is an intersection of the planned track with the predicted track, and determine that there is the collision risk of the autonomous vehicle with the obstacle if there is the intersection.

In an implementation, the predicted track determining sub-module is configured to determine the predicted track of the obstacle in the preset period according to a current speed and a current travelling direction of the obstacle.

In an implementation, the judging module may include:

a stopping distance determining sub-module configured to determine a stopping distance of the autonomous vehicle when the obstacle is of a second type; and.

a second judging sub-module configured to, when the obstacle is of a second type, determine whether the obstacle is located at a current lane of the autonomous vehicle or a lane adjacent to the current lane, and is located in front of the autonomous vehicle; if the obstacle is located at the current lane or the lane adjacent to the current lane and is located in front of the vehicle, determine whether a distance in a longitudinal direction between the obstacle and the autonomous vehicle is shorter than the stopping distance; and if the distance is shorter than the stopping distance, determine that there is the collision risk of the autonomous vehicle with the obstacle, wherein the longitudinal direction is a travelling direction of the autonomous vehicle.

In an implementation, the stopping distance determining sub-module is configured to determine the stopping distance of the autonomous vehicle according to a current speed of the autonomous vehicle and a road condition.

In an implementation, the determining module is configured to, when the obstacle has a collision risk with the autonomous vehicle in the sensible range, reduce a travelling speed of the autonomous vehicle or change a planned track of the autonomous vehicle.

According to a third aspect, an apparatus for generating a defensive driving strategy is provided according to an embodiment of the disclosure. The functions of the apparatus may be implemented by hardware, or by hardware executing corresponding software. The hardware or software includes one or more modules corresponding to the above functions.

In a possible embodiment, the structure of the apparatus includes a processor and a storage, the storage is configured to store a program for supporting the above method according to the first aspect, executed by the apparatus, and the processor is configured to execute the program stored in the storage. The apparatus further includes a communication interface configured for communication between the apparatus and another apparatus or communication network.

According to a fourth aspect, a computer-readable storage medium is provided according to an embodiment of the disclosure, for storing computer software instructions used by the device in the second aspect, the computer software instructions include programs involved in execution of the above method in the first aspect.

At least one technical solution in the technical solutions has the following advantages or beneficial effects.

According to method and device for generating a defensive driving strategy disclosed in the embodiments of the disclosure, according to a type of an obstacle around a vehicle, a collision risk determination method is selected during driving of the vehicle. The collision risk determination method is used to determine a collision risk of the vehicle with the obstacle, and in response to the collision risk of the vehicle with the obstacle, a defensive driving strategy for the vehicle is determined. By determining and processing a risk in advance, an occurrence probability of a dangerous condition on a road can be reduced.

The summary is only for the purpose of description and not intended to form limits in any manner. Besides the above-described schematic aspects, implementation modes and characteristics, further aspects, implementation modes and characteristics of the disclosure become easy to understand with reference to the drawings and the following detailed descriptions.

BRIEF DESCRIPTION OF DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present application and are not to be considered as limiting the scope of the present application.

DETAILED DESCRIPTION

In the following, only certain exemplary embodiments are briefly described. As those skilled in the art would realize, the described embodiments may be modified in various different ways, all without departing from the spirit or scope of the present application. Accordingly, the drawings and description are to be regarded as illustrative in nature and not restrictive.

A method and a device for generating a defensive driving strategy are provided according to embodiments of the disclosure. Detailed descriptions of the technical solutions will be made below with reference to the following embodiments.

Figure 1:
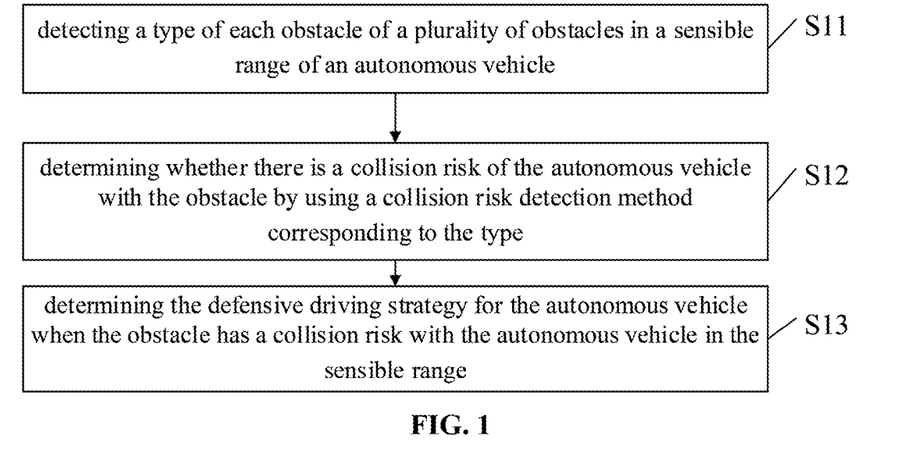
FIG. 1 is a flowchart of a method for generating a defensive driving strategy according to an embodiment of the disclosure.

FIG. 1 is a flowchart of a method for generating a defensive driving strategy according to an embodiment of the disclosure. The following steps are included.

In S11, a type of each obstacle of a plurality of obstacles in a sensible range of an autonomous vehicle is detected.

In S12, it is determined whether there is a collision risk of the autonomous vehicle with the obstacle by using a collision risk detection method corresponding to the type.

In S13, the defensive driving strategy for the autonomous vehicle is determined when the obstacle has a collision risk with the autonomous vehicle in the sensible range.

In a possible implementation, the type of the obstacle may be determined according to a size, the number of wheels, a travelling speed and the like of the obstacle.

For example, a size threshold is preset. If the size of the obstacle is greater than the size threshold, it is determined that the type of the obstacle is a first type. If the size of the obstacle is not greater than the size threshold, it is determined that the type of the obstacle is a second type.

For example, if the number of wheels of the obstacle is more than or equal to 4, it is determined that the type of the obstacle is the first type. If the number of wheels of the obstacle is less than 4, it is determined that the type of the obstacle is the second type.

For another example, a speed threshold is preset. If the travelling speed of the obstacle is greater than the speed threshold, it is determined that the type of the obstacle is a first type. If the travelling speed of the obstacle is not greater than the speed threshold, it is determined that the type of the obstacle is a second type.

According to such determining manners, an obstacle of the first type is generally a four-wheel motor vehicle, and an obstacle of the second type is generally a vehicle other than an automobile, for example, a mini-sized motor cycle like a motorcycle and an electric vehicle, and may also be a bicycle or a pedestrian. The obstacle of the second type has a characteristic of a flexibly changing direction.

Figure 2:
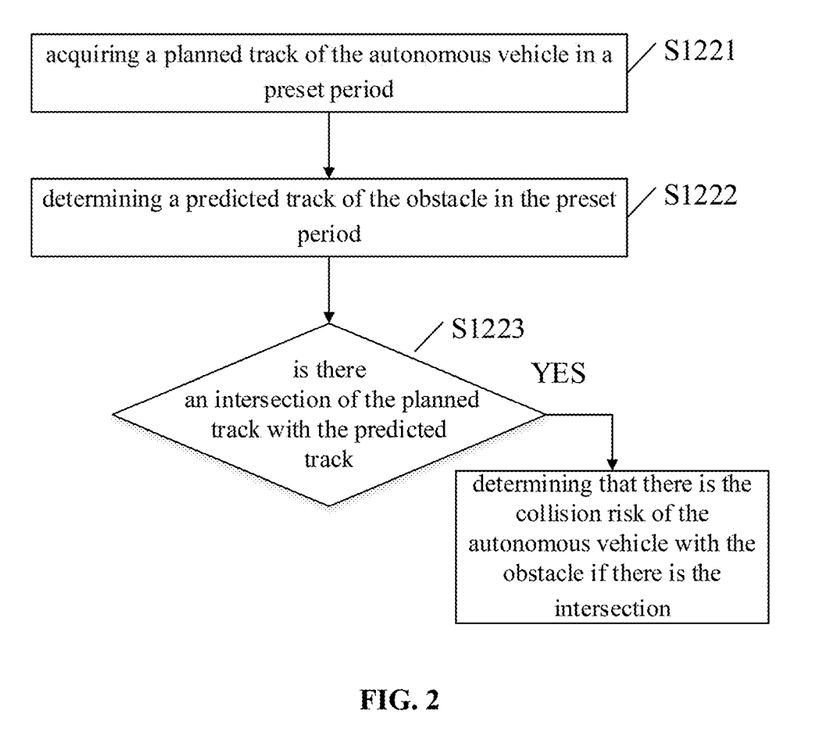
FIG. 2 is a flowchart of S12 according to an embodiment of the disclosure.

In a possible implementation, in a case that it is determined in S11 that the obstacle is an obstacle of a first type, in S12, a first collision risk determination method is determined according to the obstacle of the first type, and the collision risk of the vehicle with the obstacle is determined with the first collision risk determination method, by steps S1221 to S1223, as shown in FIG. 2.

S1221, a planned track of the autonomous vehicle in a preset period is acquired.

In S1222, a predicted track of the obstacle in the preset period is determined.

In S1223, it is determined whether there is an intersection of the planned track with the predicted track, and it is determined that there is the collision risk of the autonomous vehicle with the obstacle if there is the intersection.

Since planned tracks are generated continuously by the vehicle in a later time period in real time during travelling, the planned track in the preset period in S1221 may be extracted from the planned tracks generated in real time by the vehicle.

In S1222, the predicted track of the obstacle in the preset period is determined according to a current speed and a current travelling direction of the obstacle.

An execution sequence of S1221 and S1222 is not limited. They may be executed synchronously, and either step may also be executed at first.

For example, a real-time planned track in next 8 seconds is generated by the vehicle. If the "preset period" is set to be 2 seconds, in S1221, a planned track in next 2 seconds from a current time may be acquired from the real-time planned track generated by the vehicle. When the current speed of the obstacle is 10 meters/second, a track of the obstacle in the next 2 seconds is predicted in S1222 to be travelling for 20 meters according to a current travelling direction (10 meters/second*2 seconds=20 meters).

Figure 3:
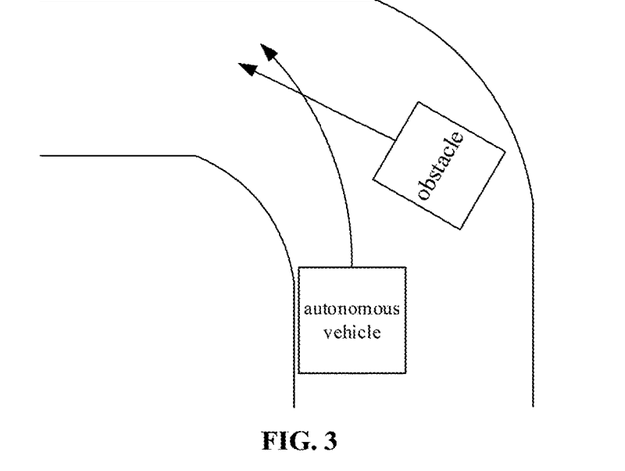
FIG. 3 is a first schematic diagram of an application scenario according to an embodiment of the disclosure.

FIG. 3 is a schematic diagram of an application scenario according to an embodiment of the disclosure. For example, at a left-turn intersection as shown in FIG. 3, a curve in front of the vehicle represents the planned track of the vehicle in the preset period, and a straight line in front of the obstacle represents the predicted track of the obstacle in the preset period. The planned track and the predicted track have an intersection, and then collision risk of the vehicle with the obstacle us determined.

Figure 4:
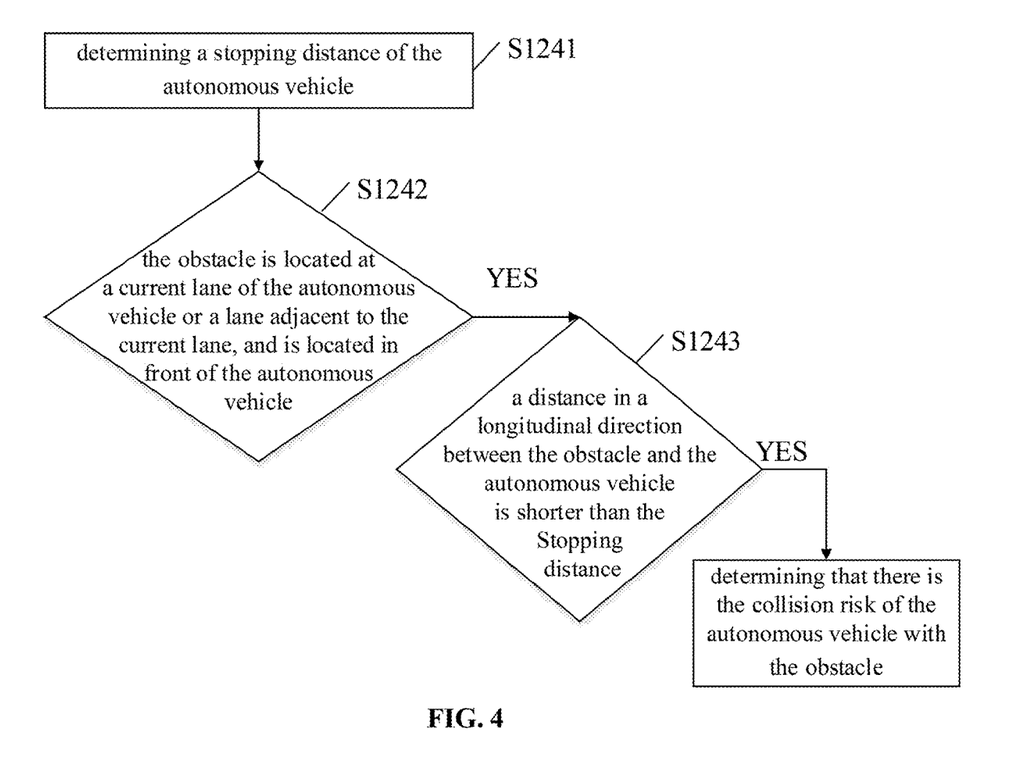
FIG. 4 is another flowchart of S12 according to an embodiment of the disclosure.

In a possible implementation, in a case that it is determined in S11 that the obstacle is an obstacle of a second type, in S12, a second collision risk determination method is determined according to the obstacle of the second type, and the collision risk of the vehicle with the obstacle is determined with the second collision risk determination method, by S1241 to S1243, as shown in FIG. 4.

In S1241, a stopping distance of the autonomous vehicle is determined.

In S1242, it is determined whether the obstacle is located at a current lane of the autonomous vehicle or a lane adjacent to the current lane, and is located in front of the autonomous vehicle.

In S1243, if the obstacle is located at the current lane or the lane adjacent to the current lane and is located in front of the vehicle, it is determined whether a distance in a longitudinal direction between the obstacle and the autonomous vehicle is shorter than the stopping distance; and if the distance is shorter than the stopping distance, it is determined that there is the collision risk of the autonomous vehicle with the obstacle, wherein the longitudinal direction is a travelling direction of the autonomous vehicle.

The stopping distance may refer to a distance of the vehicle travelling from starting braking to being completely stopped under the current speed. In a possible implementation, in S1241, the stopping distance of the vehicle may be determined according to a current speed of the vehicle and a road condition. The road condition may include road smoothness, and a road shape condition at a distance ahead of the vehicle. The road smoothness may be represented by an attachment coefficient, and the road is smoother with a lower the attachment coefficient. The road shape condition may include that a curve road or a straight road at a distance ahead of the vehicle. The stopping distance is further related to stopping performance of the vehicle.

According to the embodiment of the disclosure, respective stopping distances of respective current speeds and road conditions may be pre-calculated and stored, for example, stored in a form shown in Table 1.

TABLE 1

| Current speed | Road condition | Stopping distance |
| --- | --- | --- |
| 30 kilometers/hour | Tarmac road | 5.9 meters |
| 30 kilometers/hour | Snow-piled road | 17.7 meters |
| 30 kilometers/hour | Icy road | 35.4 meters |
| 30 kilometers/hour | . . . | . . . |
| 40 kilometers/hour | . . . | . . . |

Accordingly, according to the embodiment of the disclosure, the current speed of the vehicle and the road condition may be acquired, and the stopping distance is determined with Table 1 according to acquired information. According to the embodiment of the disclosure, the stopping distance may also be determined by another related factor, which will not be described herein.

Figure 5:
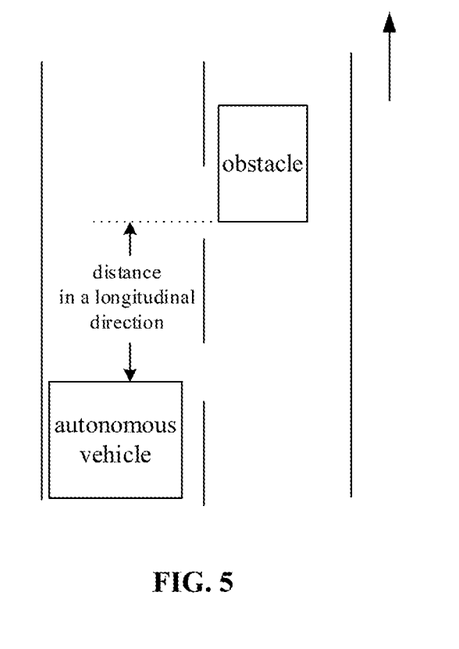
FIG. 5 is a second schematic diagram of an application scenario according to an embodiment of the disclosure.

FIG. 5 is a schematic diagram of another application scenario according to an embodiment of the disclosure. In FIG. 5, the vehicle is travelling on the left lane, and a travelling direction is a direction indicated by the arrow at the right upper corner in FIG. 5, where a travelling direction on a right lane is identical with that on the left lane. In FIG. 5, an obstacle is located on an adjacent lane of the vehicle and located in front of the vehicle. A longitudinal distance between the obstacle and the vehicle is shown in FIG. 5. When the longitudinal distance is shorter than the stopping distance of the vehicle, it is indicated that, if the obstacle suddenly turns to the vehicle, it is impossible for the vehicle to avoid a collision with the obstacle even if being immediately braked. Therefore, it may be considered that the vehicle is at a collision risk with the obstacle in such a case.

In a possible implementation, the defensive driving strategy determined in S13 may be reducing a travelling speed of the vehicle or changing a planned track of the vehicle. The reducing the travelling speed may be called reserving speed, and the changing the planned track and travelling according to the changed planned track may be called giving a way. By reserving speed or giving a way, the vehicle is kept at a safe distance away from the obstacle, thereby reducing an occurrence probability of a dangerous condition on the road.

Figure 6:
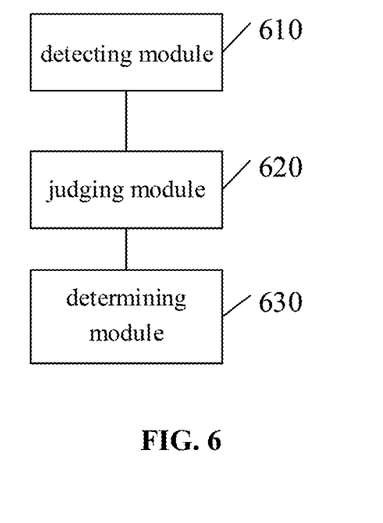
FIG. 6 is a structure diagram of a device for generating a defensive driving strategy according to an embodiment of the disclosure.

A device for generating a defensive driving strategy is provided according to an embodiment of the disclosure. Referring to FIG. 6, FIG. 6 is a structure diagram of a device for generating a defensive driving strategy according to an embodiment of the disclosure, including:

a detecting module 610 configured to detect a type of each obstacle of a plurality of obstacles in a sensible range of an autonomous vehicle;

a judging module 620 configured to determine whether there is a collision risk of the autonomous vehicle with the obstacle by using a collision risk detection method corresponding to the type; and a determining module 630 configured to determine the defensive driving strategy for the autonomous vehicle when the obstacle has a collision risk with the autonomous vehicle in the sensible range.

Figure 7:
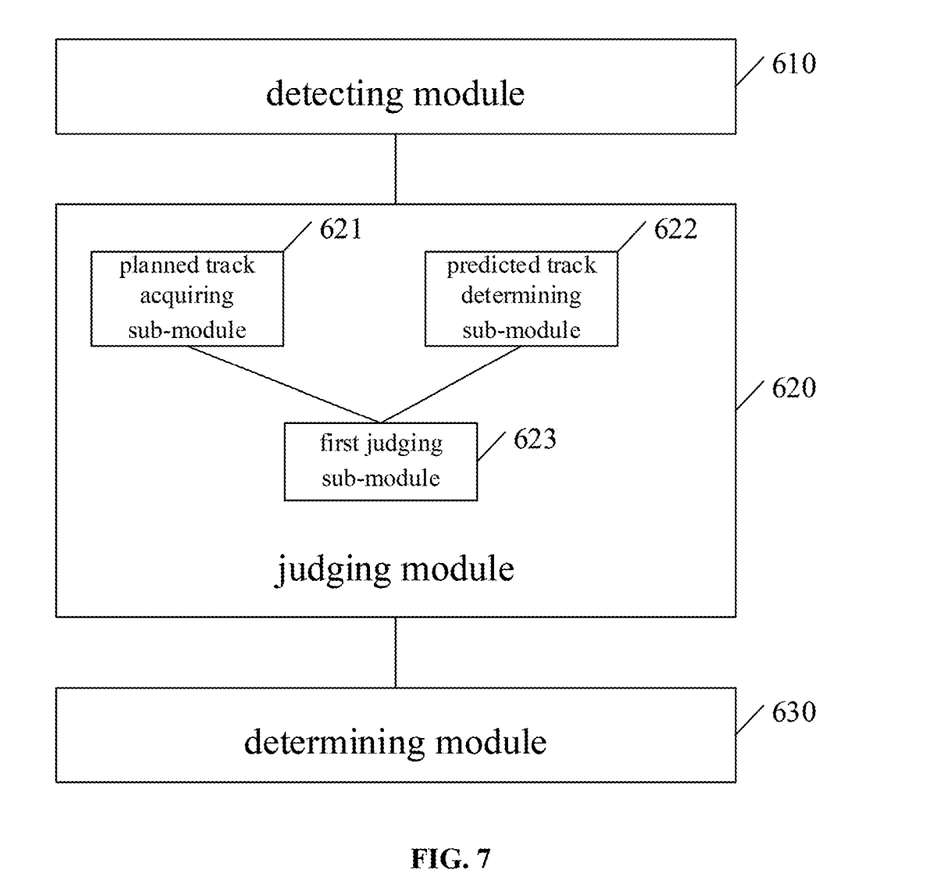
FIG. 7 is a structure diagram of another device for generating a defensive driving strategy device according to an embodiment of the disclosure.

A device for generating a defensive driving strategy is provided according to an embodiment of the disclosure. Referring to FIG. 7, FIG. 7 is a structure diagram of a device for generating a defensive driving strategy according to an embodiment of the disclosure. A detecting module 610, a judging module 620 and a determining module 630 are included.

The three modules, i.e., the detecting module 610, the judging module 620 and the determining module 630, are identical with those recited in the abovementioned embodiment and will not be repeated.

The judging module may include:

a planned track acquiring sub-module 621 configured to acquire a planned track of the autonomous vehicle in a preset period when the obstacle is of a first type;

a predicted track determining sub-module 622 configured to determine a predicted track of the obstacle in the preset period when the obstacle is of a first type; and a first judging sub-module 623 configured to determine whether there is an intersection of the planned track with the predicted track, and determine that there is the collision risk of the autonomous vehicle with the obstacle if there is the intersection.

In a possible implementation, predicted track determining sub-module 622 is configured to determine the predicted track of the obstacle in the preset period according to a current speed and a current travelling direction of the obstacle.

Figure 8:
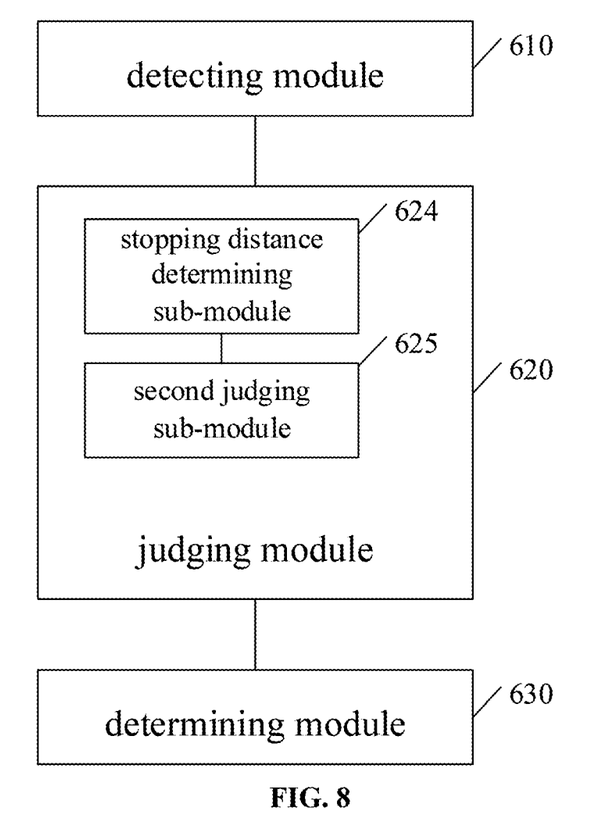
FIG. 8 is a structure diagram of another device for generating a defensive driving strategy according to an embodiment of the disclosure.

A device for generating a defensive driving strategy is provided according to an embodiment of the disclosure. Referring to FIG. 8, FIG. 8 is a structure diagram of a device for generating a defensive driving strategy according to an embodiment of the disclosure. A detecting module 610, a judging module 620 and a determining module 630 are included.

The three modules, i.e., the detecting module 610, the judging module 620 and the determining module 630, are identical with those recited in the abovementioned embodiment and will not be repeated.

The judging module may include:

a stopping distance determining sub-module 624 configured to determine a stopping distance of the autonomous vehicle when the obstacle is of a second type; and.

a second judging sub-module 625 configured to, when the obstacle is of a second type, determine whether the obstacle is located at a current lane of the autonomous vehicle or a lane adjacent to the current lane, and is located in front of the autonomous vehicle; if the obstacle is located at the current lane or the lane adjacent to the current lane and is located in front of the vehicle, determine whether a distance in a longitudinal direction between the obstacle and the autonomous vehicle is shorter than the stopping distance; and if the distance is shorter than the stopping distance, determine that there is the collision risk of the autonomous vehicle with the obstacle, wherein the longitudinal direction is a travelling direction of the autonomous vehicle.

In the three embodiments, the determining module 630 may be configured to, when the obstacle has a collision risk with the autonomous vehicle in the sensible range, reduce a travelling speed of the autonomous vehicle or change a planned track of the autonomous vehicle.

In this embodiment, functions of modules in the device refer to the corresponding description of the above mentioned method and thus the description thereof is omitted herein.

Figure 9:
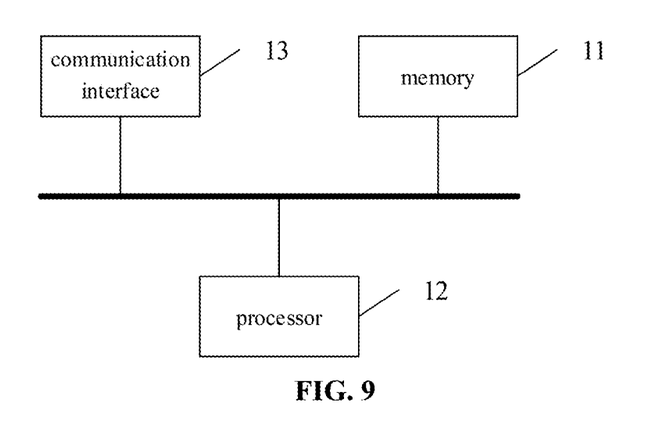
FIG. 9 is a structure diagram of an apparatus for generating a defensive driving strategy according to an embodiment of the disclosure.

An apparatus for generating a defensive driving strategy is provided according to an embodiments of the disclosure. FIG. 9 is a structure diagram of the apparatus for generating a defensive driving strategy according to an embodiment of the disclosure. The apparatus includes: a memory 11 and a processor 12.

The memory 11 stores a computer program executable on the processor 12. When the processor 12 executes the computer program, the method for generating a defensive driving strategy in the foregoing embodiment is implemented. The number of the memory 11 and the processor 12 may be one or more.

The apparatus further includes a communication interface 13 configured to communicate with an external device and exchange data.

The memory 11 may include a high-speed RAM memory and may also include a non-volatile memory, such as at least one magnetic disk memory.

If the memory 11, the processor 12, and the communication interface 13 are implemented independently, the memory 11, the processor 12, and the communication interface 13 may be connected to each other through a bus and communicate with one another. The bus may be an Industry Standard Architecture (ISA) bus, a Peripheral Component (PCI) bus, an Extended Industry Standard Component (EISA) bus, or the like. The bus may be divided into an address bus, a data bus, a control bus, and the like. For ease of illustration, only one bold line is shown in FIG. 9, but it does not mean that there is only one bus or one type of bus.

Optionally, in a specific implementation, if the memory 11, the processor 12, and the communication interface 13 are integrated on one chip, the memory 11, the processor 12, and the communication interface 13 may implement mutual communication through an internal interface.

According to an embodiment of the present disclosure, a computer-readable storage medium is provided for storing computer software instructions, which include programs involved in execution of the above the method In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

Based on the above, according to method and device for generating a defensive driving strategy disclosed in the embodiments of the disclosure, according to a type of an obstacle around a vehicle, a collision risk determination method is selected during driving of the vehicle. The collision risk determination method is used to determine a collision risk of the vehicle with the obstacle, and in response to the collision risk of the vehicle with the obstacle, a defensive driving strategy for the vehicle is determined. By determining and processing a risk in advance, an occurrence probability of a dangerous condition on a road can be reduced.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

The invention claimed is:

1. A method for generating a defensive driving strategy, comprising:
   detecting, by one or more processors, a type of each obstacle of a plurality of obstacles in a sensible range of an autonomous vehicle;
   determining, by the one or more processors, whether there is a collision risk of the autonomous vehicle with the obstacle by using a collision risk detection method corresponding to the type; and
   reducing, by the one or more processors, a travelling speed of the autonomous vehicle or changing, by the one or more processors, a planned track of the autonomous vehicle when the obstacle has a collision risk with the autonomous vehicle in the sensible range,
   wherein in response to detecting the obstacle is of a first type, determining whether there is the collision risk of the autonomous vehicle with the obstacle, by using a first collision risk detection method corresponding to the first type, comprises:
      acquiring a planned track of the autonomous vehicle in a preset period;
      determining a predicted track of the obstacle in the preset period; and
      determining whether there is an intersection of the planned track with the predicted track, and determining that there is the collision risk of the autonomous vehicle with the obstacle if there is the intersection, and
   wherein in response to detecting the obstacle is of a second type, determining whether there is the collision risk of the autonomous vehicle with the obstacle, by using a second collision risk detection method corresponding to the second type, comprises:
determining a stopping distance of the autonomous vehicle; and
determining whether the obstacle is located at a current lane of the autonomous vehicle or a lane adjacent to the current lane, and is located in front of the autonomous vehicle;
if the obstacle is located at the current lane or the lane adjacent to the current lane, and is located in front of the vehicle, determining whether a distance in a longitudinal direction between the obstacle and the autonomous vehicle is shorter than the stopping distance; and
if the distance is shorter than the stopping distance, determining that there is the collision risk of the autonomous vehicle with the obstacle, wherein the longitudinal direction is a travelling direction of the autonomous vehicle, and
wherein the obstacle of the first type is a motor vehicle with four or more wheels, and the obstacle of the second type is a bicycle, a Pedestrian, or a vehicle other than the obstacle of the first type.

2. The method of claim 1, wherein the determining a predicted track of the obstacle in the preset period comprises: determining the predicted track of the obstacle in the preset period according to a current speed and a current travelling direction of the obstacle.

3. The method of claim 1, wherein the determining the stopping distance of the autonomous vehicle comprises: determining the stopping distance of the autonomous vehicle according to a current speed of the autonomous vehicle and a road condition.

4. A device for generating a defensive driving strategy, comprising:
one or more processors; and
a storage device configured for storing one or more programs, wherein the one or more programs are executed by the one or more processors to enable the one or more processors to:
detect a type of each obstacle of a plurality of obstacles in a sensible range of an autonomous vehicle;
determine whether there is a collision risk of the autonomous vehicle with the obstacle by using a collision risk detection method corresponding to the type; and
reduce a travelling speed of the autonomous vehicle or change a planned track of the autonomous vehicle when the obstacle has a collision risk with the autonomous vehicle in the sensible range,
wherein in response to detecting the obstacle is of a first type, the one or more programs are executed by the one or more processors to enable the one or more processors further to:
acquire a planned track of the autonomous vehicle in a preset period;
determine a predicted track of the obstacle in the preset period; and
determine whether there is an intersection of the planned track with the predicted track, and determine that there is the collision risk of the autonomous vehicle with the obstacle if there is the intersection, and
wherein in response to detecting the obstacle is of a second type, the one or more programs are executed by the one or more processors to enable the one or more processors further to:

determine a stopping distance of the autonomous vehicle; and
determine whether the obstacle is located at a current lane of the autonomous vehicle or a lane adjacent to the current lane, and is located in front of the autonomous vehicle;
if the obstacle is located at the current lane or the lane adjacent to the current lane, and is located in front of the vehicle, determine whether a distance in a longitudinal direction between the obstacle and the autonomous vehicle is shorter than the stopping distance; and
if the distance is shorter than the stopping distance, determine that there is the collision risk of the autonomous vehicle with the obstacle, wherein the longitudinal direction is a travelling direction of the autonomous vehicle, and
wherein the obstacle of the first type is a motor vehicle with four or more wheels, and the obstacle of the second type is a bicycle, a pedestrian, or a vehicle other than the obstacle of the first type.

5. The device of claim 4, wherein the one or more programs are executed by the one or more processors to enable the one or more processors further to: determine the predicted track of the obstacle in the preset period according to a current speed and a current travelling direction of the obstacle.

6. The device of claim 4, wherein the one or more programs are executed by the one or more processors to enable the one or more processors further to: determine the stopping distance of the autonomous vehicle according to a current speed of the autonomous vehicle and a road condition.

7. A non-transitory computer-readable storage medium, storing computer executable instructions stored thereon, that when executed by a processor cause the processor to perform operations comprising:
detecting a type of each obstacle of a plurality of obstacles in a sensible range of an autonomous vehicle;
determining whether there is a collision risk of the autonomous vehicle with the obstacle by using a collision risk detection method corresponding to the type; and
reducing a travelling speed of the autonomous vehicle or changing a planned track of the autonomous vehicle when the obstacle has a collision risk with the autonomous vehicle in the sensible range,
wherein in response to detecting the obstacle is of a first type, the computer executable instructions, when executed by a processor, cause the processor to perform further operations comprising:
acquiring a planned track of the autonomous vehicle in a preset period;
determining a predicted track of the obstacle in the preset period; and
determining whether there is an intersection of the planned track with the predicted track, and determining that there is the collision risk of the autonomous vehicle with the obstacle if there is the intersection, and
wherein in response to detecting the obstacle is of a second type, the computer executable instructions, when executed by a processor, cause the processor to perform further operations comprising:
determining a stopping distance of the autonomous vehicle; and determining whether the obstacle is located at a current lane of the autonomous vehicle or a lane adjacent to the current lane, and is located in front of the autonomous vehicle;

if the obstacle is located at the current lane or the lane adjacent to the current lane, and is located in front of the vehicle, determining whether a distance in a longitudinal direction between the obstacle and the autonomous vehicle is shorter than the stopping distance; and if the distance is shorter than the stopping distance, determining that there is the collision risk of the autonomous vehicle with the obstacle, wherein the longitudinal direction is a travelling direction of the autonomous vehicle, and wherein the obstacle of the first type is a motor vehicle with four or more wheels, and the obstacle of the second type is a bicycle, a pedestrian, or a vehicle other than the obstacle of the first type.

8. The non-transitory computer-readable storage medium of claim 7, wherein the computer executable instructions, when executed by a processor, cause the processor to perform further operations comprising: determining the predicted track of the obstacle in the preset period according to a current speed and a current travelling direction of the obstacle.

9. The non-transitory computer-readable storage medium of claim 7, wherein the computer executable instructions, when executed by a processor, cause the processor to perform further operations comprising: determining the stopping distance of the autonomous vehicle according to a current speed of the autonomous vehicle and a road condition.

* * * * *